(12) United States Patent
Zhang et al.

(10) Patent No.: US 11,718,689 B2
(45) Date of Patent: Aug. 8, 2023

(54) METHOD FOR ISOLATING CELLULOSE- OR CHITIN-NANOCRYSTALS BY MEANS OF PERIODATE OXIDATION

(71) Applicant: Georg-August-Universitaet Goettingen Stiftung Oeffentlichen Rechts, Goettingen (DE)

(72) Inventors: Kai Zhang, Bovenden (DE); Peiwen Liu, Goettingen (DE)

(73) Assignee: GEORG-AUGUST-UNIVERSITAET GOETTINGEN STIFTUNG OEFFENTLICHEN RECHTS, Goettingen (DE)

(*) Notice: Subject to any disclaimer, the term of this patent is extended or adjusted under 35 U.S.C. 154(b) by 275 days.

(21) Appl. No.: 17/128,397

(22) Filed: Dec. 21, 2020

(65) Prior Publication Data

US 2021/0108003 A1    Apr. 15, 2021

Related U.S. Application Data

(63) Continuation-in-part of application No. PCT/EP2019/068787, filed on Jul. 12, 2019.

(30) Foreign Application Priority Data

Jul. 23, 2018  (DE) ............... 10 2018 117 741.0

(51) Int. Cl.
  C08B 37/08     (2006.01)
  C08B 15/02     (2006.01)
  C08B 15/08     (2006.01)

(52) U.S. Cl.
  CPC ............ *C08B 37/003* (2013.01); *C08B 15/02* (2013.01); *C08B 15/08* (2013.01)

(58) Field of Classification Search
  CPC ........ C08B 37/003; C08B 15/02; C08B 15/08
  See application file for complete search history.

(56) References Cited

U.S. PATENT DOCUMENTS

2004/0197288 A1    10/2004    Fleury et al.

FOREIGN PATENT DOCUMENTS

| CN | 105330755 A | 2/2016 |
|---|---|---|
| CN | 106758492 A | 5/2017 |
| CN | 107236049 A | 10/2017 |
| JP | 2009068014 A | 4/2009 |
| WO | 03002612 A1 | 1/2003 |
| WO | 2009054512 A1 | 4/2009 |
| WO | 2015070346 A1 | 5/2015 |
| WO | 2017202878 A1 | 11/2017 |

OTHER PUBLICATIONS

Yang et al., Cellulose, 2015, 22, p. 1743-1752. (Year: 2015).*
Entry for sodium periodate, ChemicalBook website, https://www.chemicalbook.com/ChemicalProductProperty_EN_CB7854352.htm, accessed online on Jan. 24, 2022. (Year: 2022).*
Yu Wu et al. "Carboxyl CNCs from Poplar", BioResources 12 (4), 8775-8785 (2017).
10 H. Yang et al. "Preparation and characterization of sterically stabilized nanocrystalline cellulose obtained by periodate oxidation of cellulose fibers", Cellulose 22:1743-1752 (2015).
H. Xie et al. "Recent Strategies in Preparation of Cellulose Nanocrystals and Cellulose Nanofibrils Derived from Raw Cellulose Materials", Hindawi International Journal of Polymer Science, vol. 2018, Article ID 7923068.
Fan et al.: "TEMPO-mediated oxidization of beta-chitin to prepare individual nanofibrils", Carbohydrate Polymers, 2009, 77(4): 832-838.
Sun Bo et al.: "Sodium periodate oxidation of cellulose nanocrystal and its application as a paper wet strength additive", Cellulose, vol. 22, No. 2, Feb. 17, 2015, pp. 1135-1146, XP035463033, ISSN: 0969-0239, DOI: 10.1007/S10570-015-0575-5.
Leguy Julien, Docteur De La Communaute Universite Grenoble Alpes: "Periodate oxidation of cellulose for internal plasticization and materials design" Mar. 30, 2018, XP55630699, URL:https://tel.archives-ouvertes.fr/tel-01852166/file/LEGUY_2018_archivage.pdf.
Theo G. M. van de Ven et al.: "Hairy cellulose nanocrystalloids: a novel class of nanocellulose", Nanoscale, vol. 8, No. 33, Jan. 1, 2016, pp. 15101-15114, XP55630710, United Kingdom, ISSN: 2040-3364, DOI: 19.1039/C6NR01570K.
Charhouf et al.: "Characterization of a Dialdehyde Chitosan Generated by Periodate Oxidation", Jan. 1, 2014, pp. 336-348, XP55630715, URL:https://pdfs.semanticscholar.org/1d09/66600ac5c21a5c0f290cc21d3c9861e31e21.pdf.
Peiwen Liu et al. "Structure Selectivity of Alkaline Periodate Oxidation on Lignocellulose for Facile Isolation of Cellulose Nanocrystals" Angew. Chem. 2020, 132, 3244-3251.
Koprivica et al.: "Regeneration of Aqueous Periodate Solutions by Ozone Treatment: A Sustainable Approach for Dialdehyde Cellulose Production" (doi.org/10.1002/anie.202002717).
Written Opinion of the International Search Authority in co-pending, related PCT Application No. PCT/EP2019/068787, dated Oct. 23, 2019.

* cited by examiner

*Primary Examiner* — Jonathan S Lau
(74) *Attorney, Agent, or Firm* — Thomas | Horstemeyer, LLP

(57) ABSTRACT

For the isolating of nanocrystals from a lignocellulose- or chitin-containing starting material, the starting material is exposed to an oxidative effect of periodate anions in an aqueous suspension. The pH value of the aqueous suspension is adjusted to greater than pH 7.0. The periodate anions are provided in a quantity of at least 5 mol per kg of the starting material, and the starting material is exposed to the oxidative effect of the periodate anions in the aqueous suspension for a period of at least one day.

20 Claims, 2 Drawing Sheets

METHOD FOR ISOLATING CELLULOSE- OR CHITIN-NANOCRYSTALS BY MEANS OF PERIODATE OXIDATION

CROSS REFERENCE TO RELATED APPLICATIONS

This application is a continuation in part to international application no. PCT/EP2019/068787 entitled "Verfahren zum Isolieren von Cellulose-oder Chitinnanokristallen durch Periodatoxidation", filed on Jul. 12, 2019 and claiming priority to German patent application no. 10 2018 117 741.0, also entitled "Verfahren zum Isolieren von Cellulose-oder Chitinnanokristallen durch Periodatoxidation" and filed Jul. 23, 2018.

FIELD OF THE INVENTION

The invention relates to a method for isolating nanocrystals from a lignocellulose- or chitin-containing starting material by means of periodate oxidation, in which the starting material is exposed to an oxidative effect of periodate anions in an aqueous suspension. Depending on the starting material, the isolated nanocrystals are cellulose- or chitin-nanocrystals.

Due to its English name cellulose-nanocrystals, cellulose-nanocrystals are also designated as CNC. CNC have a high crystallinity. Their typical diameter is less than 100 nm, their length less than 500 nm.

CNC have a high potential in production of regenerative and bio-degradable materials in various technical fields.

A special use of CNC is that one in the formation of so-called High Internal Phase Pickering Emulsions (HIPE) in which the CNC accumulate at the boundary layers of the different components of the emulsion and stabilize the emulsion, like for example an oil-in-water emulsion. CNC are contained in various lignocellulose-containing starting materials. These starting materials inter alia include wood, straw and other, particularly fiber-containing, biomasses. In the lignocellulose-containing starting materials, the CNC are, as a rule, not present in a free state but are components of lignocellulose-fibers in which they are connected by amorphous cellulose into continuous structures.

Besides chitin, cellulose is the most prevalent polysaccharide and serves for structure formation. It differs from cellulose by one acetamide group. Chitin is contained in various biological starting materials which are based on fungi or various animals. The shells of crustaceans and shell fishes comprise high concentrations of chitin, the chitin-nanocrystals being included in structures bound by amorphous chitin.

Chitin-nanocrystals (ChNC) have similar dimensions as CNC and they also comprise a high crystallinity and a high potential in the production of regenerative and bio-degradable materials in various technical fields.

BACKGROUND OF THE INVENTION

A method in which ammonium persulfate oxidation is used to isolated CNC from lignocellulose-containing starting material obtained from hybrid poplars is known from Yu Wu et al. "Carboxyl CNCs from Poplar", BioResources 12 (4), 8775-8785 (2017). The isolated CNC are additionally treated with sodium periodate to selectively oxidize hydroxyl groups at the C2-C3-position of the cellulose into carboxyl groups.

A production of CNC by periodate oxidation of lignocellulose-containing starting materials is known from H. Yang et al. "Preparation and characterization of sterically stabilized nanocrystalline cellulose obtained by periodate oxidation of cellulose fibers", Cellulose 22:1743-1752 (2015). Here, $NaIO_4$ and NaCl are added to a wet fiber slurry, and the reaction takes place in darkness under stirring for four days until it is stopped by the addition of ethylene glycol for quenching the remaining periodate. Afterwards, the CNC are treated with hot water and then separated from the aqueous solution.

H. Xie et al. "Recent Strategies in Preparation of Cellulose Nanocrystals and Cellulose Nanofibrils Derived from Raw Cellulose Materials", Hindawi International Journal of Polymer Science, Volume 2018, Article ID 7923068, give an overview over different methods of isolating CNC, inter alia using sodium periodate as an oxidation agent followed by sodium chloride as a further oxidation agent.

A method for isolating cellulose-nanocrystals in which a cellulose starting material is for 4.5 to 18 hours stirred in a reaction liquid of a pH-value between pH 9 and pH 11 is known from CN 107 236 049 A. The reaction liquid is a mixture of nitroxide as a source of nitrogen radicals, periodate, sodium bromide and sodium hypochlorite. Particularly, the nitroxide is 2,2,6,6-tetramethylpiperidine oxinitride (TEMPO). The periodate is potassium periodate, sodium periodate or barium periodate, and it is used in an amount of 1 to 4 mol/kg cellulose. The sodium hypochloride may be replaced by sodium chloride. The ratio of nitrogen radicals and periodate in the reaction liquid is in a range from 1:2 to 1:8.

A method of reducing cellulose-nanocrystals in which a cellulose starting material is stirred for 4.5 to 18 hours in a reaction liquid having a pH-value in a range from pH 10 to pH 11 is known from Chinese patent application publication CN 106 758 492 A. The reaction liquid is a mixture of TEMPO, periodate, sodium bromide and sodium hypochloride. TEMPO is used in an amount between 0.25 and 1 mol/kg cellulose. The periodate is used in an amount of 1 to 4 mol/kg cellulose. The ratio of TEMPO to periodate is between 1:2 and 1:8.

A method for producing polysaccharide-nanofibers by persulfate oxidation is known from Chinese patent application publication CN 105 330 755 A.

A method for producing chitin-nanocrystals by means of persulfate oxidation in a strongly acid pH-range of not more than pH 4 is known from international application publication WO 2015/070 346 A1.

A method for producing chitin-nanofibers in which, in a first step, crystalline beta-chitin is purified in an acidic solution having a pH-value of pH 5 or less and a digestion takes place by means of a TEMPO oxidation is known from international application publication WO 2009/054 512 A1.

Fan et al.: "TEMPO-mediated oxidization of beta-chitin to prepare individual nanofibrils", Carbohydrate Polymers, 2009, 77(4): 832-838, disclose a TEMPO-mediated oxidative production of chitin-nanocrystals in aqueous solution at pH 10.

International application publication WO 2003/002 612 A1 discloses the production of polymers from polysaccharides. The polymer may be chitosan, i. e. a de-acetylisated chitin. In a first step of the known method, a polysaccharide is treated with an aqueous solution having a pH-value between pH 6 and pH 8. The oxidation agent may be periodate.

A method for producing oxidized chitin or oxidized chitosan is known from Japanese patent application publication JP 2009 068014 A. Here, the carbon at the sixth position of a pyranose ring of N-acetyl-glucosamine as a monosaccharide-component of chitin is selectively oxidized into a carboxy group and/or its salt. As oxidation agent, inter alia TEMPO together with periodate, in a preferred alkaline pH-value range, is disclosed.

There still is a need of a method for isolating cellulose- and chitin-nanocrystals which is as simple and assured of success as possible, but which nevertheless stands out due to a high yield.

SUMMARY OF THE INVENTION

The present invention relates to a method of isolating nanocrystals from a lignocellulose-or chitin-containing starting material. The method comprises providing periodate anions in an amount of at least 5 mol per kg of the starting material; and exposing the starting material to an oxidative effect of the periodate anions for a period of at least one day in an aqueous suspension, a pH-value of the aqueous suspension being adjusted to higher than pH 7.0.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components of the drawings are not necessarily to scale, emphasize instead being placed upon clearly illustrating the principles of the present invention. In the drawings, like reference numerals designate corresponding parts throughout the several views.

DETAILED DESCRIPTION

Figure 1:
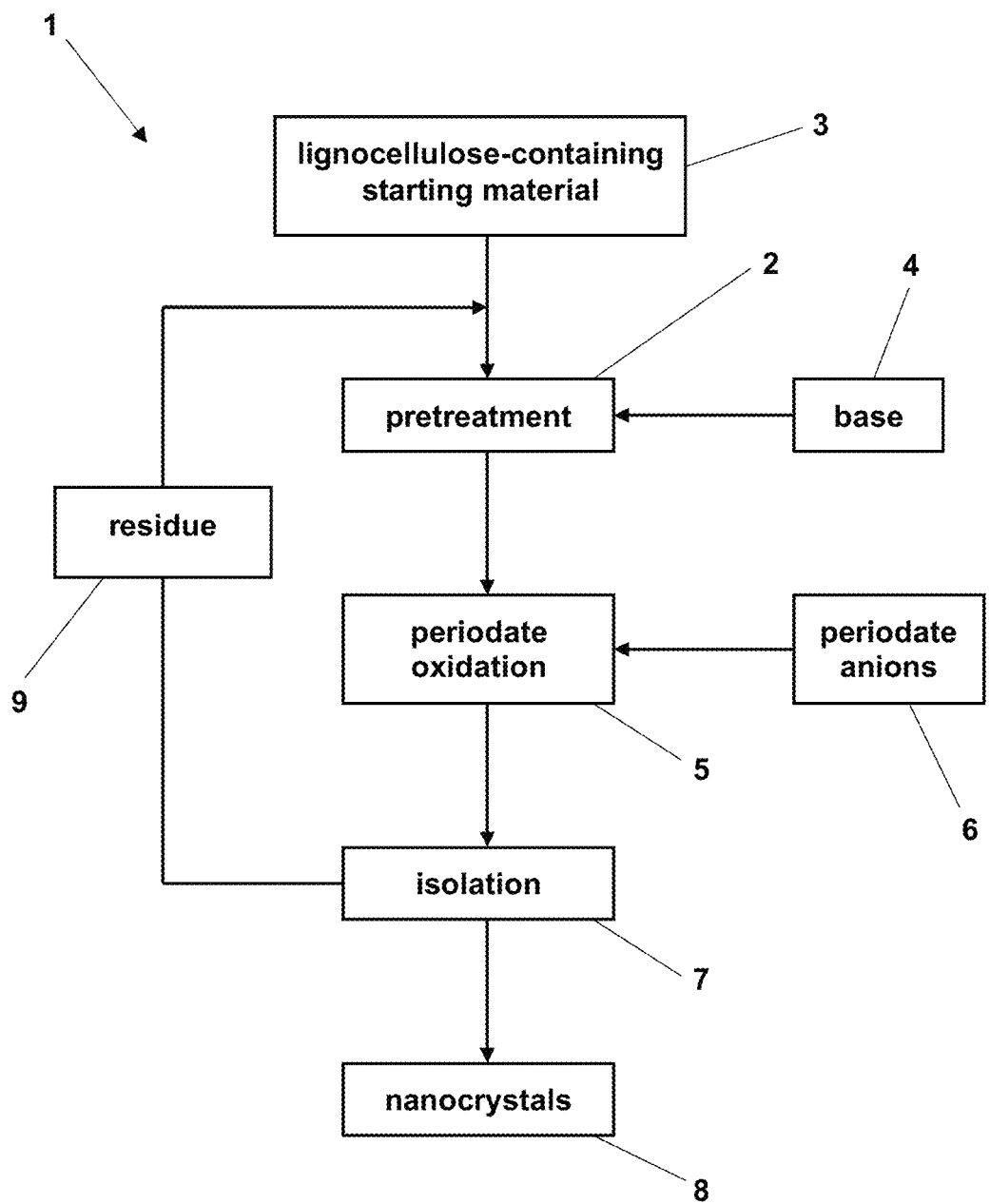
FIG. 1 shows a flow diagram of the method for isolating cellulose-nanocrystals (CNC) and chitin-nanocrystals (ChNC)

In the method according to the present disclosure for isolating nanocrystals from a lignocellulose- or chitin-containing starting material, wherein the starting material is exposed to an oxidative effect of periodate anions in an aqueous suspension, the pH-value of the aqueous solution is adjusted to above pH 7.0. The periodate anions are provided in an amount of at least 5 mol per kg of the starting material, and the starting material is exposed to the oxidative effect of the periodate anions in the aqueous suspension for a period of at least one day.

Surprisingly, it is seen that the periodate oxidation effected by the periodate anions highly selectively degrades amorphous cellulose and amorphous chitin in the alkaline pH-range above pH 7.0, whereas crystalline cellulose and crystalline chitin and thus also the cellulose- and chitin-nanocrystals of interest are not degraded or only degraded to an insignificant extent.

In the known methods for isolating cellulose- or chitin-nanocrystals from a lignocellulose-containing or chitin-containing starting material by means of periodate oxidation, the periodate anions do not act under alkaline aqueous conditions but under acidic aqueous conditions or not as the essential oxidation agent but in combination with the stronger oxidation agent TEMPO on the starting material.

However, under acidic aqueous conditions, no selectivity of the periodate oxidation for amorphous cellulose and amorphous chitin is present. This selectivity surprisingly occurs above pH 7.0. Due to the high selectivity of the periodate-oxidation at this high pH-value, there is no need for a particular survey of the oxidation in the method according to the present disclosure. Particularly, it is not relying on a particular time management or a particular dosage of the periodate anions except of that the amount of periodate, with at least 5 mol per kg starting material and preferably at least 6 mol per kg starting material is significantly higher than in the known combination of TEMPO with periodate. Even if, after the successful periodate-oxidation of the amorphous cellulose or the amorphous chitin, periodate anions are still present, they do not or only with a very low velocity degrade crystalline cellulose and crystalline chitin under aqueous conditions at the mentioned pH-values so that the nanocrystals of interest may without problem be recovered, even after a longer holding time in the aqueous solution.

In the method according to the present disclosure, a significant amount of the nanocrystals contained in the starting material is set free by means of degradation of amorphous cellulose and amorphous chitin after about a day and at the latest after about three days of the action of the periodate anions at the pH-values mentioned. Typically, the contained crystalline cellulose or the contained crystalline chitin is at least essentially completely set free after about 10 to 15 days of the action of the periodate anions. As already pointed out, the periodate anions may also act upon the starting material for a longer time without significantly reducing the yield of CNC or ChNC by degradation of CNC or ChNC which have been set free. Thus, the starting material may also be exposed to the oxidative effect of the periodate anions for clearly longer than 15 days, for example up to 30 days. In this case, the selective oxidation by means of the periodate lasts significantly longer in the method according to the present disclosure than the known oxidation with TEMPO and periodate in combination. This is a direct consequence of the higher selectivity of the oxidation in the method according to the present disclosure for amorphous cellulose and amorphous chitin.

In case of suitable lignocellulose-containing or chitin-containing starting materials, the method according to the present disclosure allows for achieving yields of CNC of more than 50 percent by weight and of ChNC of even more than 60 percent by weight related to the starting material.

In the method according to the present disclosure it is preferred that the periodate anions, to whose oxidative effect the starting material is exposed under alkaline conditions in the aqueous suspension, include $H_3IO_6^{2-}$-ions and/or $H_2IO_6^{3-}$-ions. It is even more preferred that the periodate anions predominantly, i. e. to more than 50% or preferably to more than 75%, or even more preferred to more than 90% and most preferred to more than 95%, consist of exactly these ions. The dosage of the periodate anions is preferably made such that they are used with the lignocellulose-containing starting material in an amount of up to 30 mol per kg of the starting material. A preferred concentration is in a range from 6 mol to 20 mol periodate anions per kg of the lignocellulose-containing starting material. Often, 7 mol to 8 mol periodate anions per kg of the lignocellulose-containing starting material are advantageous.

On the other hand, with the chitin-containing starting material, it may be suitable to use the periodate anions in an amount of up to 60 mol per kg of the starting material. A preferred amount is between 30 mol and 50 mol per kg of the starting material, i. e. at about 40 mol per kg of the chitin-containing starting material or slightly below.

Generally, the optimum concentration of the periodate anions depends on the amount of amorphous cellulose or amorphous chitin in the starting material to be degraded. However, the values mentioned have been proven to be advantageous for different starting materials. In this context, the mass of the starting material relates to its dry matter, particularly the dry matter of its lignocellulose-containing fibers or its chitin-containing components.

In the method according to the present disclosure, the periodate anions may be provided by adding periodic acid, orthoperiodic acid, paraperiodic acid and/or at least one periodate to the aqueous suspension. Particularly, the periodate may be an alkaline or alkaline earth salt of periodic acid, orthoperiodic acid or paraperiodic acid. Even more particularly, the periodate may be sodium periodate, sodium paraperiodate or potassium periodate.

In the method according to the present disclosure, the pH-value higher than pH 7.0 is not yet adjusted by adding the periodate anions in one of the forms mentioned. Instead, as a rule, the pH-value has to be brought into the desired pH-range by adding at least one base to the aqueous suspension. In doing so, the starting material may be pretreated with this base before it is exposed to the oxidative effect of the periodate anions in the aqueous suspension. Such an alkaline pretreatment of a lignocellulose-containing starting material prior its oxidative treatment for isolating contained crystalline cellulose is generally known from the prior art. However, no periodate oxidation while keeping the alkaline aqueous conditions of the pretreatment follows there.

The base by which the pH-value of the aqueous suspension is increased above pH 7.0 during the periodate oxidation may particularly be selected from ammonia, alkaline amine salts and alkaline hydroxides. Particularly preferably, the base is potassium hydroxide. An advantage of the use of potassium hydroxide as the base is the high solubility of potassium periodate under the alkaline conditions in water as, for example, compared to sodium periodate, such that the periodate anions when using potassium hydroxide are present in a higher number in dissociated form and thus available for the desired periodate oxidation of the amorphous cellulose or the amorphous chitin.

Actually, the potassium hydroxide may be added to the periodate anions at a mol ratio of 2.0 to 2.8 or more preferred from 2.2 to 2.8.

The pH-value of the aqueous suspension is preferably adjusted clearly higher than pH 7.0 and particularly higher than pH 8.0, more preferred higher than pH 9.0. Generally, pH-values higher than 13.0 are not suitable. Most times, a pH-value lower than pH 12.0 and often even lower than pH 11.0 is sufficient. A pH-value of about pH 10 has proven to be suitable.

As principally known from the prior art, it is also suitable in the method according to the present disclosure to execute the periodate oxidation in darkness to protect the periodate anions against light and thus against a photo-induced degradation.

In the method according to the present disclosure, the periodate oxidation is carried out in a typical temperature range from 10° C. to 30° C., i. e. at room temperature or close to room temperature.

In the method according to the present disclosure, the periodate oxidation is, as a rule, carried out in the complete absence of TEMPO and any other nitroxide. In any case, the aqueous suspension includes TEMPO in an amount of at maximum 0.1 mol per kg of the starting material. In the majority of the cases, the aqueous suspension contains TEMPO in an amount of at maximum 0.01 mol and in most cases of 0.001 mol per kg of the starting material.

The nanocrystals set free by the periodate oxidation may be separated from the remainder of the aqueous suspension in that they are, for example, directly filtered off and/or centrifuged off the suspension or a supernatant of the suspension over residues of the starting material. It is to be understood that the CNC or ChNC separated in this way may afterwards be washed or chemically post-treated. However, for many uses of CNC and ChNC, the latter is not necessary. Instead, the CNC and ChNC produced by the method according to the present disclosure are characterized by functional groups at their surface, of which about up to a third are carboxyl-groups. Additionally, the CNC and ChNC isolated according to the present disclosure comprise homogeneous properties. Thus, once isolated according to the present disclosure, if suitable after drying, they may be used as an additive for plastics and or for stabilization of oil-in-water emulsions. The residues of the starting materials which are separated in isolating the CNC and ChNC according to the present disclosure may be once again subjected to the method according to the present disclosure, because they may, to a certain extent, still comprise CNC or ChNC connected to each other by amorphous cellulose and amorphous chitin into structures of higher density.

Now referring in greater detail to the drawings, FIG. 1 is a flow diagram of an embodiment the method 1 according to the present disclosure. Here, the method 1 starts with an optional pretreatment 2 of the lignocellulose-containing or chitin-containing starting material 3 with a base 4. For this purpose, the starting material 3 is taken up in an aqueous solution of the base 4. In case of microcrystalline cellulose powder (MCC) and pulp, the pretreatment 2 is often not necessary. In case of natural fibers and sawdust as lignocellulose-containing starting material 3, this step is very helpful for increasing the yield of cellulose-nanocrystals (CNC), as it is the case with shells of crustacean and shell fish for increasing the yield of chitin-nanocrystals (ChNC). For a periodate oxidation 5 following to the pretreatment 2, periodate anions 6 are added, and, if suitable, further base 4 is added to adjust a pH-value of the aqueous suspension of about pH 10 for the periodate oxidation 5. The periodate oxidation 5 is carried out for two weeks and in darkness to protect the periodate anions against photochemical degradation. Afterwards, an isolation 7 of the CNC or ChNC 8 of interest takes place by, for example, centrifuging a supernatant of the aqueous suspension, whereas a sediment or residue 9 of the suspension is submitted once again to the pretreatment 2 or, alternatively, directly once again to the periodate oxidation 5.

The periodate anions may be regenerated for use with new starting material 3 or with the sediment or residue 9 of the suspension. Several possibilities are known to the person skilled in the art. For example, the regeneration can be realized by a treatment with ozone, as described by Peiwen Liu et al. "Structure Selectivity of Alkaline Periodate Oxidation on Lignocellulose for Facile Isolation of Cellulose Nanocrystals" Angew. Chem. 2020, 132, 3244-3251, or via electrochemistry, as described in (doi.org/10.1002/anie.202002717), which are both incorporated herein by reference.

The materials used in the following examples have been obtained from the following sources: periodic acid, sodium metaperiodate, potassium periodate, sodium hydroxide, potassium hydroxide, sodium paraperiodate, lithium hydroxide and ammonia have been obtained from Sigma-Aldrich (Darmstadt, Germany). Avicel PH-101 microcrystalline cellulose powder (MCC) having an average particle size of 50 μm was obtained from Fluka Sigma-Aldrich (Darmstadt, Germany). Cotton was bought in a supermarket. Pulp was received as a gift from Lenzing (Lenzing, Austria). Sawdust both from softwood and hardwood was taken from the workshop of the inventors. Straw was bought in a supermarket. Newsprint paper was derived from the university of the inventors. Purified and disintegrated shells of shell fish and crustaceans were used as chitin-containing starting material.

Isolating CNC

In an embodiment example of the method according to the present disclosure for isolating CNC without pretreatment 2 according to FIG. 1, 1.76 g $H_5IO_6$ were dissolved in 50 ml deionized water. The pH-value of this solution was adjusted to above 8.5 with aqueous potassium hydroxide solution. One gram lignocellulose-containing starting material was added. A reaction flask with the reaction mixture was kept in darkness in that several layers of aluminum foil were wrapped around the flask. The periodate oxidation 5 was executed for two weeks at room temperature continuously stirring at a velocity of 700 rotations per minute. Directly after the periodate oxidation 5, the reaction mixture was separated by centrifugation at 12,000 rotations per minute for ten minutes on an ultracentrifuge (Thermo Scientific Multifuge X3 FR, 15-6•100y). The material separated by centrifugation was washed three times with deionized water and once again collected by centrifugation. After the washing, the material separated by centrifugation was treated with ultrasound (Elmasonic P, 37 kHz, 100 W) for twenty minutes, and the product was purified by dialysis in water using a dialysis membrane having a molecular weight cut-off value of 10,000 Da (Thermo Fisher Scientific). Finally, the aqueous solution of 3 to 8 mg solid matter/ml was treated for five minutes with ultrasound and kept overnight at 4° C. Afterwards, the stable upper phase of the suspension included the cellulose-nanocrystals which have afterwards been collected and used for the yield calculation.

Variations with regard to the base used and the pH-value adjusted by it are recorded in the following Table 1:

TABLE 1

Optimization with regard to the base used and the pH-value adjusted therewith

| Starting material[a] | Oxidation reagent | Base | pH-value | Reaction time (d) | Yield of CNC (%) |
|---|---|---|---|---|---|
| MCC | $H_5IO_6$ (1.76 g) | — | 0.9 | 36 h | 0 |
| MCC | $H_5IO_6$ (1.76 g) | $NH_4OH$ | 6.5 | 14 | 5 |
| MCC | $H_5IO_6$ (1.76 g) | $NH_4OH$ | 7.5 | 14 | 22 |
| MCC | $H_5IO_6$ (1.76 g) | [b]KOH (~1.02 g) | 10 | 14 | 50 |
| MCC | $H_5IO_6$ (1.76 g) | KOH | 12 | 14 | |
| MCC | $H_5IO_6$ (3.52 g) | KOH | 10 | 14 | |
| MCC | $H_5IO_6$ (5.28 g) | KOH | 10 | 14 | |
| MCC | $H_5IO_6$ (7.04 g) | KOH | 10 | 14 | 39 |
| MCC | $H_5IO_6$ (1.76 g) | KOH | 10 | 30 | 48 |

[a]The amount of MCC was 1 g, and the starting material was not pretreated
[b]The mol ratio of KOH to $H_5IO_6$ was 2.355

In every case, the starting material was MCC, i. e. the microcrystalline cellulose powder Avicel PH-101, in an amount of 1 g. The yield of CNC is related to this amount, i. e. the dry matter of the starting material. A high yield of CNC was achieved at a pH-value of 10 using KOH as the base. The comparative example indicated in the first line of Table 1 without addition of a base proves that a strongly acidic pH-value of pH 0.9 resulted from the added amount of $H_5IO_6$. According to preliminary results (not indicated in Table 1), very high pH-values, like in the example of line 5, have a negative effect on the yield, probably due to a stronger uncontrolled hydrolysis of the cellulose chains by alkali.

The examples reported in Table 2 cover a reaction time from one to 14 days, wherein the yield increased very strongly at the beginning and in total up to 50%.

TABLE 2

Different reaction times, using KOH as the base.

| Starting Material 1 g) | Chemicals | | | | |
|---|---|---|---|---|---|
| | Source of the periodate anions (1.76 g) | Base (~1.02 g) | pH-value Initially | Reaction time (d) | Yield (%) |
| MCC | $H_5IO_6$ | KOH | 10 | 1 | 10 |
| MCC | $H_5IO_6$ | KOH | 10 | 3 | 28 |
| MCC | $H_5IO_6$ | KOH | 10 | 6 | 32 |
| MCC | $H_5IO_6$ | KOH | 10 | 10 | 37 |
| MCC | $H_5IO_6$ | KOH | 10 | 14 | 50 |

The mol ratio of KOH to $H_5IO_6$ was 2.355

In the Table 3, examples are listed which, partially, also include a pretreatment 2 according to FIG. 1 with KOH as the base. Table 3 further covers different lignocellulose-containing starting materials as well as different sources of the periodate anions and different bases for adjusting the alkaline pH-value. When using $Na_3H_2IO_6$ as the source of the periodate anions, no further base needs to be used to adjust the desired alkaline pH-value. The sometimes only small percentages of the yield of CNC related to the dry matter of the starting material are, in case of different starting materials, related to their composition. The oxidation reactivity of $H_5IO_6$ as well as of other periodate anions species strongly depends on their concentrations. A very high concentration of these periodate anions results in a stronger and quicker oxidation even of the crystalline cellulose, see the example according to line 9 of Table 3. In comparison, the amount of these periodate anions in the example in line 10 of Table 3 is more advantageous, i. e. only a very slow oxidation occurs at the CNC, so that a higher yield of CNC is achieved.

solution (2 percent by weight in water) and the pH-value was adjusted to pH 7.0 using aqueous NaOH of 1 mol/l.

Figure 2:
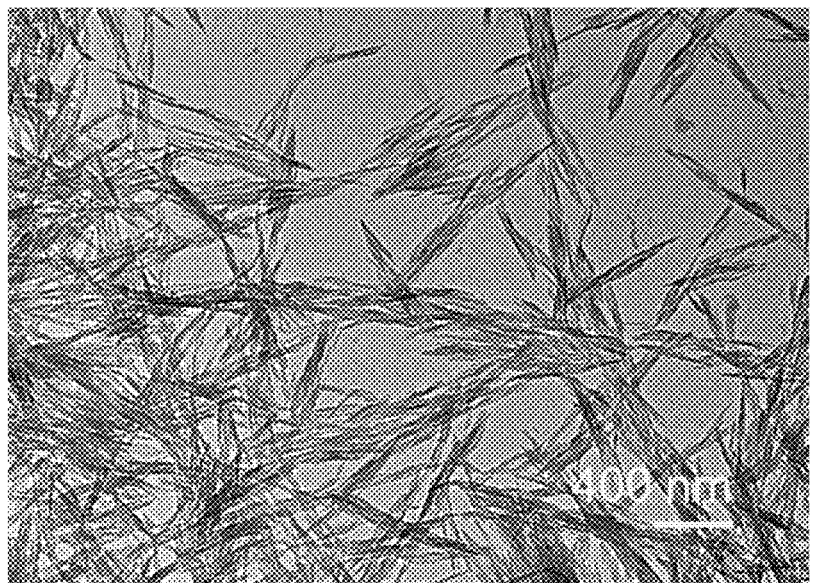
FIG. 2 shows a TEM image of chitin-nanocrystals (ChNC) isolated according to the method.

FIG. 2 shows an obtained TEM image of the chitin-nanocrystals isolated according to the present disclosure. The diameters of the chitin-nanocrystals depicted in the drawings are between 10 and 30 nm and their average length is in a range from 250 to 400 nm.

TABLE 3

Overview over different starting materials and reaction conditions

| Starting material (1 g) | Pretreatment | Chemicals Source of the periodate anions | Base | pH-value | Reaction time (d) | Yield (%) |
|---|---|---|---|---|---|---|
| MCC | - - - | $H_5IO_6$ (1.76 g) | KOH | 10 | 14 | 50 |
| MCC | - - - | $H_5IO_6$ (1.76 g) | KOH | 10 | 30 | 54 |
| MCC | - - - | $NaIO_4$ (1.65 g) | NaOH | 10 | 14 | 42 |
| MCC | - - - | $NaIO_4$ (1.65 g) | NaOH | 7.5 | 14 | 39 |
| MCC | - - - | $NaIO_4$ (1.65 g) | β-Alanine | 10 | 14 | 30 |
| MCC | - - - | $H_5IO_6$ (1.76 g) | LiOH | 7.5 | 14 | 34 |
| MCC | - - - | $H_5IO_6$ (1.76 g) | LiOH | 10 | 14 | 37 |
| MCC | - - - | $Na_3H_2IO_6$ (2.27g) | - - - | 12.18 | 14 | 42 |
| MCC | KOH | $H_5IO_6$ (7.0 g) | KOH | 10 | 14 | 31 |
| MCC | KOH | $H_5IO_6$ (1.76 g) | KOH | 10 | 14 | 48.4 |
| Cotton | KOH | $H_5IO_6$ (1.76 g) | KOH | 10 | 14 | 11 |
| Pulp-hardwood | KOH | $H_5IO_6$ (1.76 g) | KOH | 10 | 14 | 42 |
| Pulp-softwood | KOH | $H_5IO_6$ (1.76 g) | KOH | 10 | 14 | 36 |
| Straw | KOH | $H_5IO_6$ (1.76 g) | KOH | 10 | 14 | 2 |
| Sawdust-pine | KOH | $H_5IO_6$ (7.0 g) | KOH | 10 | 14 | 17 |
| Sawdust-beech | KOH | $H_5IO_6$ (7.0 g) | KOH | 10 | 14 | 7 |
| Newsprint paper | KOH | $H_5IO_6$ (1.76 g) | KOH | 10 | 14 | |
| Hemp | KOH | $H_5IO_6$ (1.76 g) | KOH | 10 | 14 | 20 |

Isolating ChNC

In an embodiment example of the method according to the present disclosure for isolating ChNC without pretreatment 2 according to FIG. 1, 7.0 g $H_5IO_6$ together with deionized water were added in a reaction flask. As desired, the pH-value of this solution was adjusted between pH 6 and pH 8.5 by ammonia and between pH 8.5 and pH 14 by aqueous potassium hydroxide solution. One gram chitin was added, and the reaction volume was filled up to 150 ml. The periodate oxidation 5 was carried out for two weeks in darkness, at room temperature and continuously stirring. At the end of the periodate oxidation 5, the reaction mixture was centrifuged at 14,000 rotations per minute for twenty minutes on an ultracentrifuge (Thermo Scientific Multifuge X3 FR, 15-6•100y). The solid matter centrifuged-off was re-suspended in deionized water, and 5 ml ethylene glycol were added before the suspension was treated for one hour with ultrasound (Elmasonic P 30 H, 37 kHz, 180 W) in ice-cold water. Afterwards, the solid product was purified by dialysis in water using a dialysis membrane having a molecular weight cut-off value of 10,000 Da (Thermo Fisher Scientific), and the volume of the suspension obtained was fixed to 100 ml. The stable chitin-nanocrystals in the supernatant after 20 minutes centrifugation at 3,000 rotations per minute and 25° C. were used for calculating the yield and for further characterization. To accelerate the isolation and to increase the yield of chitin-nanocrystals, the chitin-containing starting material may be softened in 3 percent by weight KOH solution for 24 hours.

The dry ChNC were characterized by transmission electron microscopy (TEM), wherein the samples were prepared from their suspension in water at 0.01 percent by weight. The TEM observations were carried out on a CM12-transmission electron microscope by Phillips, The Netherlands. The samples were dyed with tungsten phosphorus acid The carboxyl groups of the isolated chitin-nanocrystals were determined by titration. Prior to the titration, the pH-value of the ChNC suspension was adjusted to pH 2 using aqueous HCl-solution of 1 mol/l. Then, the suspension was titrated on a 665 Dosimat (Metrohm) at a dosage rate of 0.01 mm/s up to pH 11, wherein the conductivity was recorded using the 865 Conductivity Modul (Metrohm) at intervals of 2 seconds. The pH-changes were also monitored. From the course of the conductivity and the pH-curves, the NaOH-concentrations were determined which neutralize the carboxyl groups and the amino groups. From this, the amount of the carboxyl groups at the surface of the chitin-nanocrystals were determined to 0.114±0.05 mol/kg and the concentration of amino groups to 0.098±0.05 mol/kg ChNC.

By means of changing the pH-value in the periodate oxidation, the influence of the pH-value on the yield of chitin-nanocrystals was determined. Table 4 shows that after the periodate reaction for 14 days the highest yield of chitin-nanocrystals was obtained at pH 10. Starting from pH 6 it is achieved to isolate ChNC at a relevant yield.

TABLE 4

Yields of chitin-nanocrystals after reaction at different pH-values

| pH-value | Yield of chitin-nanocrystals (percent by weight) |
|---|---|
| 4 | 0 |
| 5 | 0 |
| 6 | 4 |
| 7 | 7 |
| 8 | 7 |
| 9 | 30 |
| 10 | 46 |

TABLE 4-continued

Yields of chitin-nanocrystals after reaction at different pH-values

| pH-value | Yield of chitin-nanocrystals (percent by weight) |
| --- | --- |
| 12 | 17 |
| 13 | 12 |
| 14 | 8 |

Table 5 shows the effect of the amount of periodate used related to the chitin-containing starting material. 1.76 g, 3.52 g and 7.04 g periodic acid have been used to oxidize 1 g chitin at pH 10. After 14 days reaction, the highest yield of chitin-nanocrystals was 46 percent by weight using 7.04 g periodic acid. For comparison, nearly no isolated chitin-nanocrystals were obtained after 14 days reaction, when only 1.76 g periodic acid had been used.

TABLE 5

Influence of the amount of periodate used related to the chitin

| Mass ratio periodate acid:chitin | Yield of chitin-nanocrystals (percent by weight) |
| --- | --- |
| 1.76 | ~0 |
| 3.52 | 7 |
| 7.04 | 46 |

Table 6 shows the yields of isolated chitin-nanocrystals after reaction times of up to 30 days. When using 7.04 g periodic acid to oxidize 1 g chitin at pH 10, the yield of isolated chitin-nanocrystals was determined for different reaction times. The amount of isolated chitin-nanocrystals, which are obtained in the method according to the present disclosure, continuously increases after 24 hours reaction time. After three days, a significant yield is present. After 14 days reaction, the yield is about 46 percent by weight. After 30 days reaction, it reaches 60 percent by weight.

TABLE 6

Yield of chitin-nanocrystals after reaction of up to 30 days

| Days | Yield of chitin-nanocrystals (percent by weight) |
| --- | --- |
| 1 | 0 |
| 3 | 7 |
| 6 | 13 |
| 10 | 25 |
| 14 | 46 |
| 30 | 60 |

Many variations and modifications may be made to the preferred embodiments of the invention without departing substantially from the spirit and principles of the invention. All such modifications and variations are intended to be included herein within the scope of the present invention, as defined by the following claims.

We claim:

1. A method of isolating nanocrystals from a lignocellulose- or chitin-containing starting material, the method comprising
providing periodate anions in an amount of at least 5 mol per kg of the starting material; and
exposing the starting material to an oxidative effect of the periodate anions for a period of at least one day in an aqueous suspension, a pH-value of the aqueous suspension being adjusted to higher than pH 7.0.

2. The method of claim 1, wherein the starting material is exposed to the oxidative effect of the periodate anions for a period in a range between 3 and 30 days in the aqueous suspension.

3. The method of claim 1, wherein the periodate anions include at least $H_3IO_6^{2-}$-ions or $H_2IO_6^{3-}$-ions.

4. The method of claim 1, wherein the periodate anions predominantly consist of periodate anions selected from $H_3IO_6^{2-}$-ions and $H_2IO_6^{3-}$-ions.

5. The method of claim 1, wherein, in case of the lignocellulose-containing starting material, the periodate anions are provided in an amount in a range from 6 mol to 10 mol per kg of the starting material.

6. The method of claim 1, wherein, in case of the chitin-containing starting material, the periodate anions are provided in an amount in a range from 30 mol to 50 mol per kg of the starting material.

7. The method of claim 1, wherein the periodate anions are provided by adding at least one of periodic acid, orthoperiodic acid, paraperiodic acid and a periodate to the aqueous suspension.

8. The method of claim 1, wherein the periodate anions are provided by adding at least one of an alkaline salt of periodic acid, orthoperiodic acid or paraperiodic acid and an alkaline earth salt of periodic acid, orthoperiodic acid or paraperiodic acid to the aqueous suspension.

9. The method of claim 1, wherein the periodate anions are provided by adding at least one of sodium periodate, sodium paraperiodate and potassium periodate to the aqueous suspension.

10. The method of claim 1, wherein the pH-value is adjusted in that at least one base is added to the suspension.

11. The method of claim 10, wherein the starting material, prior to being exposed to the oxidative effect of the periodate anions in the aqueous suspension, is pretreated with the at least one base in the aqueous suspension.

12. The method of claim 11, wherein the at least one base is selected from ammonia, alkaline amine salts and alkaline hydroxides.

13. The method of claim 12, wherein the at least one base is potassium hydroxide.

14. The method of claim 1, wherein the potassium hydroxide is added to the periodate anions (6) at a mol ratio in a range between 2.0 to 2.8.

15. The method of claim 1, wherein the pH-value of the aqueous suspension is adjusted to at least one of higher than pH 9.0 and lower than pH 12.0.

16. The method of claim 1, wherein the periodate anions in the aqueous suspension are protected against light.

17. The method of claim 1, wherein the starting material is exposed to the oxidative effect of the periodate anions at a temperature in a range from 10° C. to 30° C. in the aqueous suspension.

18. The method of claim 1, wherein the aqueous suspension includes TEMPO in an amount of at maximum 0.01 mol per kg of the starting material or no TEMPO at all.

19. The method of claim 1, wherein the nanocrystals are separated after the starting material has been exposed to the oxidative effect of the periodate anions in the aqueous suspension in that the nanocrystals are filtered-off or centrifuged-off from the suspension or a supernatant of the suspension over residues of the starting material.

20. The method of claim 19, wherein the periodate anions are regenerated.

\* \* \* \* \*